(No Model.)  3 Sheets—Sheet 1.

G. D. HAWORTH.
CORN CUTTING AND SHOCKING MACHINE.

No. 482,355.  Patented Sept. 13, 1892.

Witnesses:
W. J. Sankey.
R. H. Orwig.

Inventor: George D. Haworth,
By Thomas G. Orwig, Attorney.

(No Model.) 3 Sheets—Sheet 3.
G. D. HAWORTH.
CORN CUTTING AND SHOCKING MACHINE.

No. 482,355. Patented Sept. 13, 1892.

Witnesses: W. J. Saulsey, J. Ralph Orwig.

Inventor: George D. Haworth, By Thomas G. Orwig, Attorney.

UNITED STATES PATENT OFFICE.

GEORGE D. HAWORTH, OF ACKWORTH, IOWA.

CORN CUTTING AND SHOCKING MACHINE.

SPECIFICATION forming part of Letters Patent No. 482,355, dated September 13, 1892.

Application filed February 25, 1892. Serial No. 422,827. (No model.)

*To all whom it may concern:*

Be it known that I, GEORGE D. HAWORTH, a citizen of the United States of America, residing at Ackworth, in the county of Warren and State of Iowa, have invented a new and useful Corn Cutting and Shocking Machine, of which the following is a specification.

My object is to produce a machine provided with a reciprocating cutter-bar adapted for cutting corn, and also with mechanism adapted to collect the cornstalks into shocks and place them in an upright position in the field.

My invention consists, primarily, in the construction of the shocking device, in the construction and combination of various other parts of the machine, and in certain other features hereinafter more specifically set forth, pointed out in my claims, and illustrated in the accompanying drawings, in which—

Figure 1:
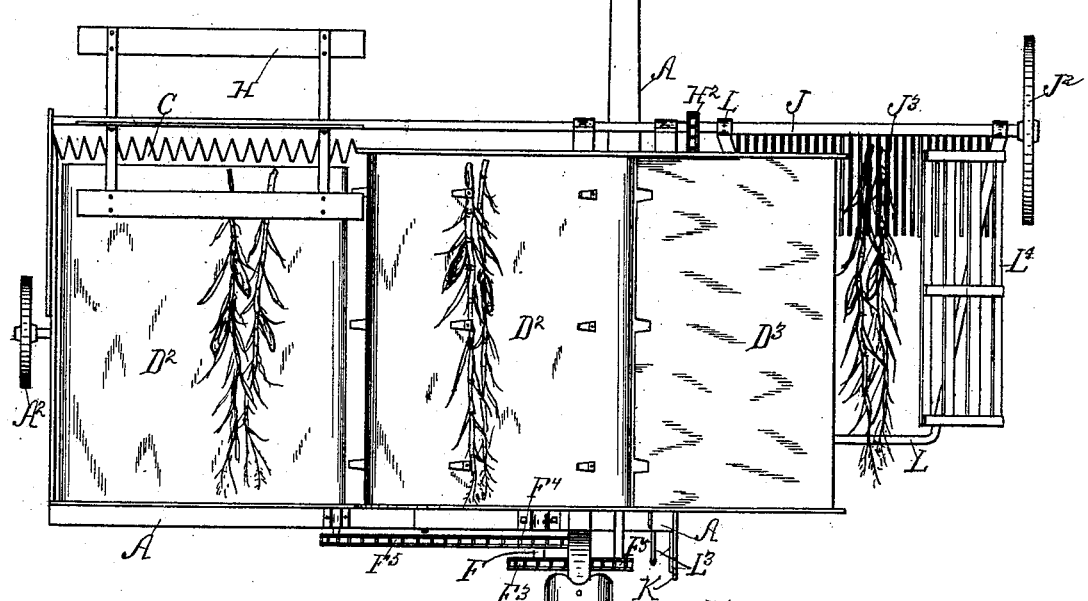
Figure 2:
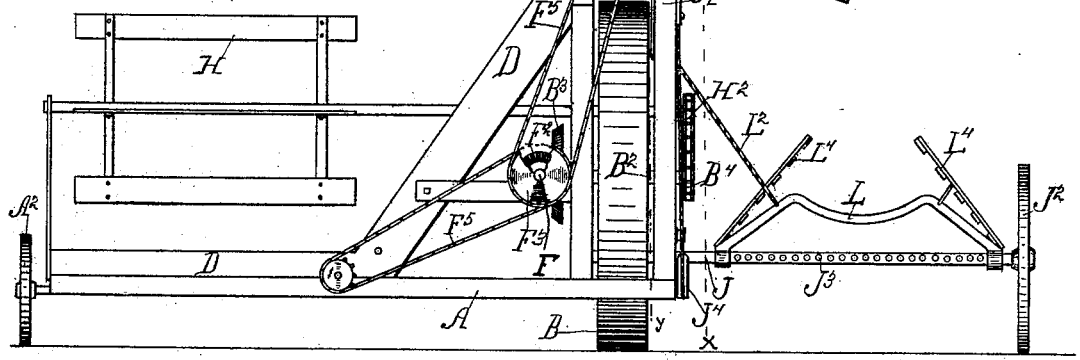
Figure 3:
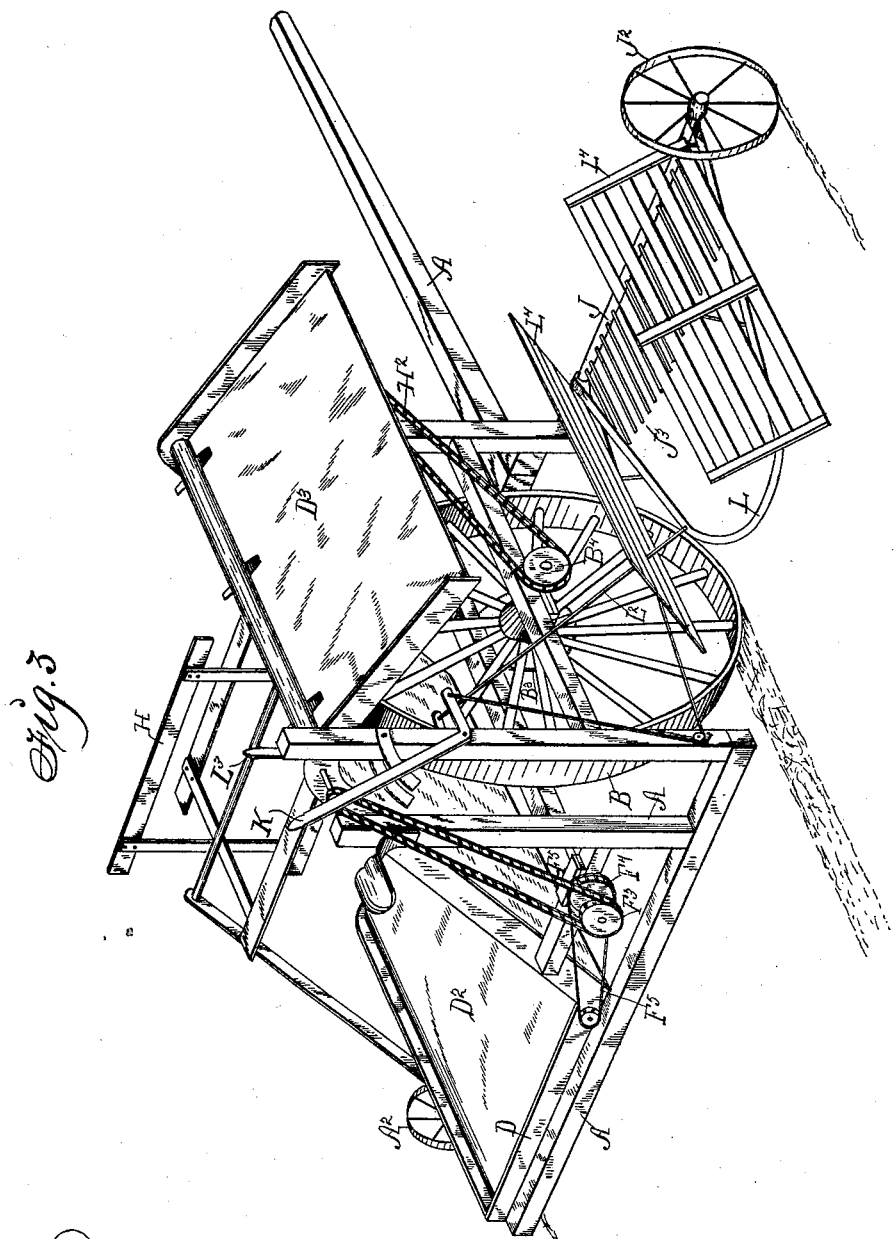
Figure 4:
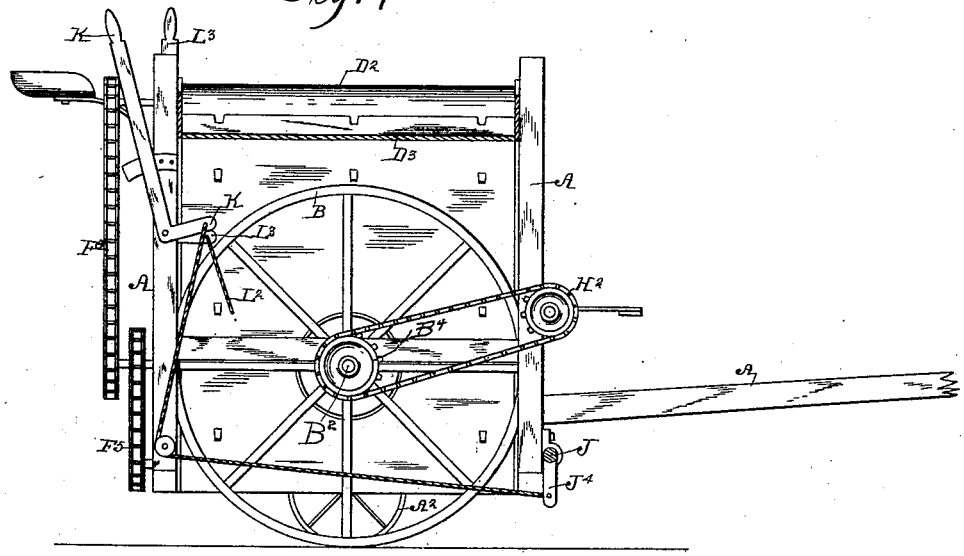
Figure 5:
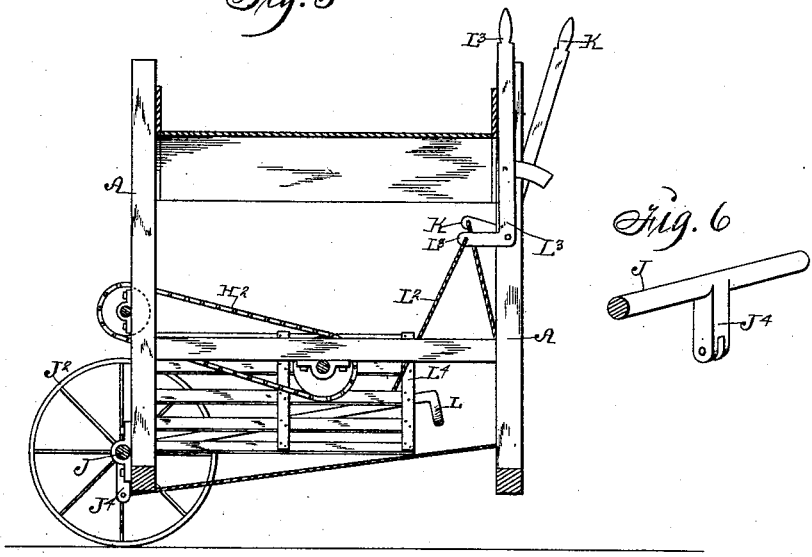
Figure 6:
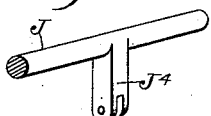

Figure 1 is a top or plan view, Fig. 2 a rear end elevation, and Fig. 3 a perspective view, of the complete machine. Fig. 4 is a vertical longitudinal sectional view through the line $x$ $x$ of Fig. 2. Fig. 5 is a vertical longitudinal sectional view through the line $y$ $y$ of Fig. 2. Fig. 6 is an enlarged perspective view of part of the axle J and the arm $J^4$.

The reference-letter A is used to represent the various parts of the supporting-frame of the device, including the tongue.

$A^2$ is a wheel adapted to support the outer end of the endless-carrier frame.

B represents a traction-wheel fixed to an axle $B^2$, which is mounted in bearing-blocks fixed to a portion of the frame A. To one end of the axle $B^2$ is fixed a bevel-wheel $B^3$, and to its other end a sprocket-wheel $B^4$.

C represents a reciprocating cutter-bar adapted in size and strength for cutting cornstalks. It operates in a common manner.

D represents a frame adapted to support an endless carrier $D^2$. It extends from the outer end of the cutter-bar over the top of the machine and terminates in a chute $D^3$, which directs the cornstalks into the shocking device, hereinafter described. This endless carrier is operated in the following manner:

F represents a shaft journaled in bearings fixed to a part of the frame A. Its central portion has a bevel-wheel $F^2$ fixed thereto and adapted to mesh with and be rotated by the bevel-wheel $B^3$. Two sprocket-wheels $F^3$ and $F^4$ are fixed to its rear end, and its forward end is provided with means for operating the cutter-bar C. These sprocket-wheels $F^3$ and $F^4$ have sprocket-chains $F^5$ connecting them with sprocket-wheels fixed to the ends of the rollers, over which the endless carrier passes, as required, to operate the endless carrier when the traction-wheel B is being rotated.

H represents a reel of common form adapted to be operated by means of a sprocket-chain $H^2$, connecting the sprocket-wheel $B^4$ with a sprocket-wheel on the end of the reel-shaft, as clearly shown in Figs. 1 and 4.

J represents an axle rotatably mounted in bearing-blocks fixed to one side of the forward end of the frame A and provided with a wheel $J^2$ on its outer end. A plurality of rods or fingers $J^3$ are fixed to the said axle and extended rearwardly therefrom. A downwardly-projecting crank-arm $J^4$ is also fixed to this axle and a rope attached thereto and connected with a lever K, which is provided with a detent device, as required, to hold the rods or fingers $J^3$ either downward or in an approximately-horizontal position.

L represents a metal bar having its ends placed on the axle J and its central portion extended rearwardly and adapted, in connection with the rods or fingers $J^3$, to carry the stalks of corn when placed thereon by the endless carrier. The rear end of this bar L is supported by means of a rope or bar $L^2$, fixed thereto and connected with a lever $L^3$, which is provided with a detent device and adapted to elevate the rear end thereof when the lever is operated. Attached to each side of the said bar L is a guide $L^4$, which guides are adapted to form the cornstalks into a compact shock ready to be tied.

The practical operation of the cutter-bar, endless carrier, and other parts in common use in reapers, it is believed, will be readily understood by those skilled in the art to which it appertains, so that a detailed description of the shocking device only is deemed necessary to an understanding of the machine.

Assuming that the machine is being drawn through a field by draft-animals and the stalks are being carried to the chute $D^3$, it will be seen that they will be deposited in the shocking device with their butts resting on the bar or fingers J³, and also that the guides L⁴ will form the stalks into a compact shock ready to be tied. This may be done by hand or by employing any common knotter. When it is desired to release a shock of corn and leave it standing upright in the field, the lever which moves the axle is operated as required to incline the fingers J³ downward, thereby allowing the butts of the cornstalks to engage the ground, and then operating the lever, which elevates the rear end of bar L, thereby raising the top of the shock and allowing it to pass between the fingers J³ and bar L.

Having thus described my invention, what I claim as new, and desire to secure by Letters Patent, is—

1. A machine for cutting and shocking corn, consisting of the frame, cutter-bar, endless carrier, and reel, constructed and adapted to operate substantially in the manner set forth, in combination with a shocking device comprising a frame adapted to receive and form the stalks into a compact bundle or shock and having the forward part of the frame upon which the butts rest adapted to be inclined downward and the rear end of the frame adapted to be elevated, substantially in the manner set forth, for the purposes stated.

2. A corn-shocking device adapted to be connected with a machine adapted for cutting corn, comprising an axle with a wheel on its outer end, a frame composed of rods or fingers connected with said axle and provided with means whereby it may be inclined downwardly, and another frame connected with the said axle, adapted to contain a plurality of cornstalks and provided with means whereby it may be raised, substantially in the manner set forth, for the purposes stated.

3. An improved corn-shocking device adapted to be connected with a machine adapted for cutting corn, comprising an axle adapted to be mounted in a part of the frame of a corn-cutting machine, a plurality of fingers or rods fixed to the said axle, a crank-arm fixed to the said axle, a rope attached to the said crank-arm and to a lever provided with a detent device, a frame attached to the said axle and adapted to support a number of cornstalks, and a rope attached to the said frame and to a lever, substantially as and for the purposes stated.

GEORGE D. HAWORTH.

Witnesses:
W. N. BARTHOLOMEW,
DAVID D. DUFF.